(12) United States Patent
Lee et al.

(10) Patent No.: US 8,218,098 B2
(45) Date of Patent: Jul. 10, 2012

(54) DISPLAY PANEL WITH AN ELECTROSTATIC PROTECTION MEMBER FOR A LIQUID CRYSTAL DISPLAY DEVICE

(75) Inventors: Dong-Yub Lee, Siheung-si (KR); Seock-Cheon Song, Suwon-si (KR); Sung-Hee Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 346 days.

(21) Appl. No.: 12/700,607

(22) Filed: Feb. 4, 2010

(65) Prior Publication Data

US 2010/0201900 A1    Aug. 12, 2010

(30) Foreign Application Priority Data

Feb. 10, 2009   (KR) .................. 10-2009-0010641

(51) Int. Cl.
*G02F 1/1333*    (2006.01)
(52) U.S. Cl. ......................................... 349/40
(58) Field of Classification Search .................... 349/40
See application file for complete search history.

(56) References Cited

U.S. PATENT DOCUMENTS

2008/0088758 A1*  4/2008  Shie ................. 349/40
2008/0180591 A1*  7/2008  Shie ................. 349/40

* cited by examiner

*Primary Examiner* — Richard Kim
(74) *Attorney, Agent, or Firm* — Innovation Counsel LLP

(57) ABSTRACT

A display panel of a liquid crystal display device includes a first substrate including a display area (DA) having a plurality of pixel portions, and a peripheral area (PA) surrounding the display area. A second substrate of the display panel comprises a common electrode and an electrostatic protection member electrically disconnected from the common electrode and surrounding the common electrode. The electrostatic protection member is electrically connected to a fixed-voltage terminal through the first substrate. A liquid crystal layer is provided between the first substrate and the second substrate.

22 Claims, 9 Drawing Sheets

DISPLAY PANEL WITH AN ELECTROSTATIC PROTECTION MEMBER FOR A LIQUID CRYSTAL DISPLAY DEVICE

CROSS-REFERENCE TO RELATED APPLICATION

This application claims priority from Korean Patent Application No. 10-2009-0010641 filed on Feb. 10, 2009 in the Korean Intellectual Property Office, the disclosure of which is incorporated herein by reference in its entirety.

BACKGROUND OF THE INVENTION

1. Field of the Invention

The present invention relates to liquid crystal display (LCD) devices, and more particularly to protection of LCD device circuits from static electricity.

2. Description of the Related Art

Currently, liquid crystal display (LCD) devices are some of the most widely used flat panel display (FPD) devices. The LCD device has two substrates on which field-generating electrodes are formed, and has a liquid crystal layer interposed between the substrates. A voltage is applied to the electrodes to rearrange the liquid crystal molecules of the LCD device, thereby controlling the amount of transmitted light.

The technological development of LCD devices has witnessed complicated designs with respect to connecting the LCD circuitry to the power line which carries the power supply voltage and to various signals lines. These designs can undesirably lead to overcurrent or overvoltage reaching the LCD circuitry through the power supply line or the signal lines due to externally generated static electricity.

In particular, an LCD device includes a display panel assembly which includes a display panel and various circuits, possibly semiconductor integrated circuits (chips), for supplying signals to the display panel. Static electricity may flow into the LCD circuits through the display panel. In other words, the static electricity may be transmitted to driver semiconductor chips through the display panel. Some of the LCD circuits, including a timing controller and other circuits, are mounted on a printed circuit board (PCB). Other LCD circuits, including integrated circuits, may be packaged in a separate semiconductor package attached to the LCD panel and the PCB. Static electricity generated in the LCD panel may be transmitted to the semiconductor package and then to the PCB and may damage the timing controller or other circuits. This damage may impede proper functioning of the timing controller or other circuits, thereby degrading the display quality of the LCD device.

SUMMARY

Some embodiments of the present invention provide a display panel protected against static electricity.

Some embodiments also provide a liquid crystal display device protected from static electricity.

The invention is defined by the appended claims incorporated into this section by reference.

According to an aspect of the present invention, there is provided a display panel comprising: a first substrate comprising: a display area (DA) having a plurality of pixel portions, and a peripheral area (PA) surrounding the display area; a second substrate comprising a common electrode and an electrostatic protection member electrically disconnected from the common electrode and surrounding the common electrode and electrically connected to a fixed-voltage terminal through the first substrate; and a liquid crystal layer between the first substrate and the second substrate.

According to an aspect of the present invention, there is provided a liquid crystal display device comprising: a light source; and a display panel for receiving light from the light source and display an image, the display panel comprising: a first substrate comprising a display area (DA) having a plurality of pixel portions, and a peripheral area (PA) surrounding the display area; a second substrate comprising a common electrode and an electrostatic protection member electrically disconnected from the common electrode and surrounding the common electrode and electrically connected to a fixed-voltage terminal through the first substrate; and a liquid crystal layer between the first substrate and the second substrate.

Other aspects of the present invention are defined by the appended claims.

BRIEF DESCRIPTION OF THE DRAWINGS

The above and other features and advantages of the present invention will become more apparent from description of some embodiments thereof with reference to the attached drawings in which.

DETAILED DESCRIPTION OF SOME EMBODIMENTS

Figure 1:
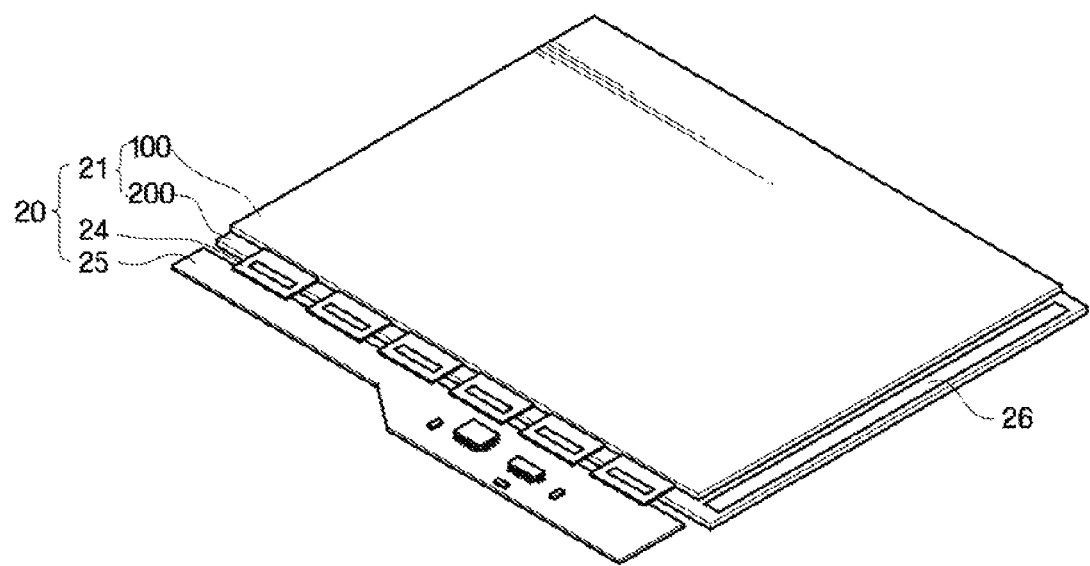
FIG. 1 is a perspective view illustrating a display panel assembly including a display panel according to a first embodiment of the present invention.

Some advantages and features of the present invention will now be illustrated by the following detailed description of some embodiments and the accompanying drawings. The present invention is not limited to these embodiments however but is defined by the appended claims. In the drawings, the sizes and relative sizes of layers and regions may be exaggerated for clarity.

It will be understood that when an element or layer is referred to as being "on", "connected to", or "coupled to" another element or layer, then intervening elements or layers may or may not be present. In contrast, the phrases "directly on," "directly connected to", or "directly coupled to" indicate that there are no intervening elements or layers. Like numbers refer to like elements throughout.

Spatially relative terms such as "below", "beneath", "lower", "above", "upper", and the like, may be used herein for ease of description in reference to the spatial orientation of elements as illustrated in the figures. It will be understood that the spatially relative terms are not intended to limit the spatial orientation of the elements while in use or operation.

The illustrations in the drawings are schematic rather than representing every detail of every feature. Also, variations from the illustrated shapes may result, for example, from manufacturing techniques and/or tolerances. Thus, the present invention should not be construed as limited to the particular shapes illustrated herein. Thus, the drawings are not intended to limit the scope of the present invention.

Exemplary embodiments of the present invention will now be explained in detail with reference to the accompanying drawings. These embodiments relate to certain types of LCD devices, but the invention includes other types of LCD devices and also includes non-LCD displays.

Figure 2:
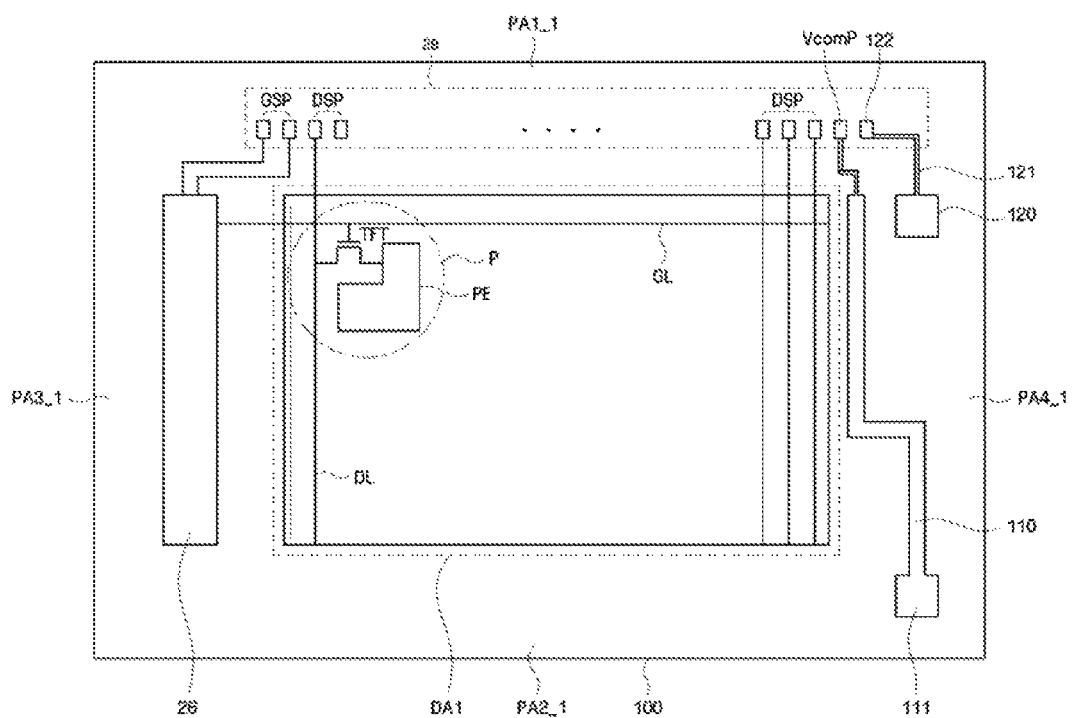
FIG. 2 is a plan view illustrating a first substrate of the display panel shown in FIG. 1.
Figure 3:
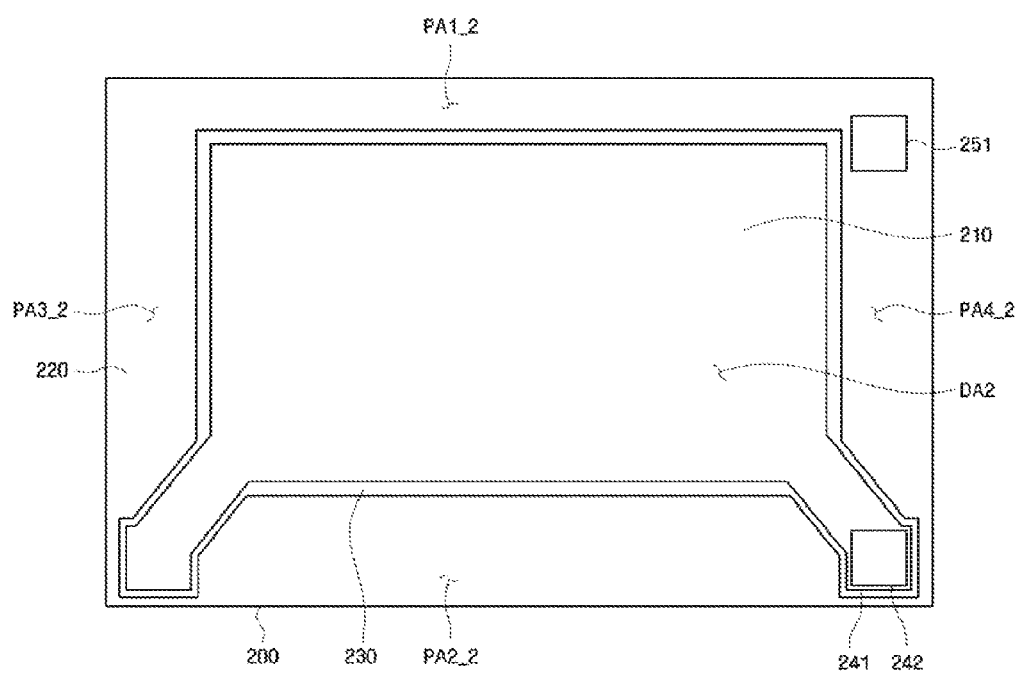
FIG. 3 is a plan view illustrating a second substrate of the display panel shown in FIG. 1.
Figure 4:
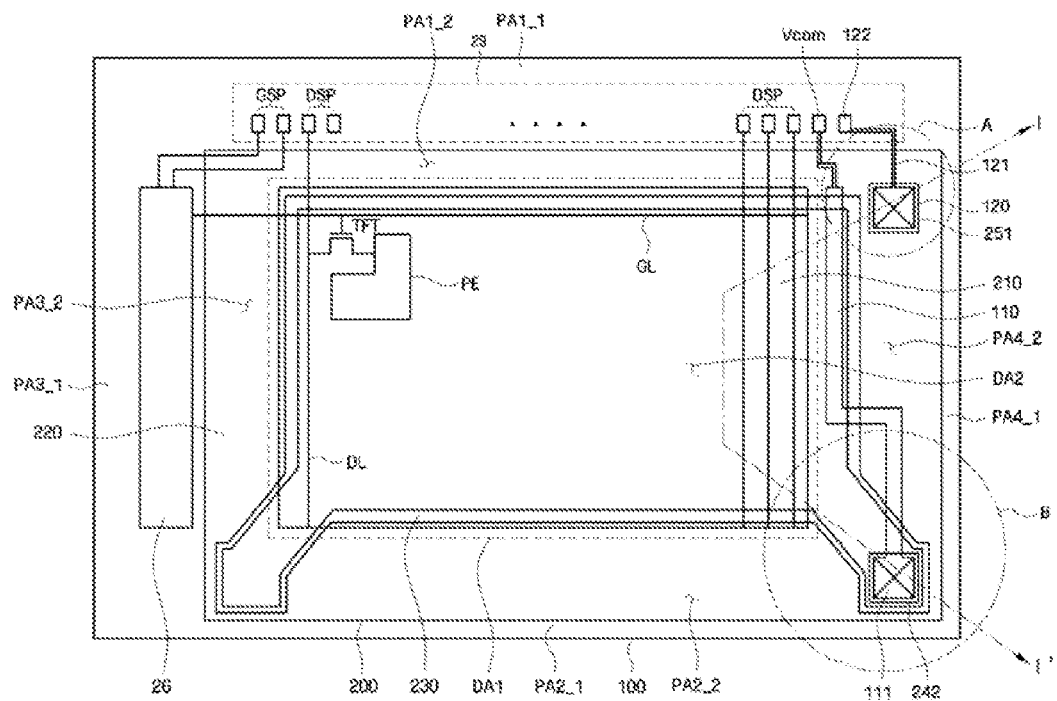
FIG. 4 is a plan view illustrating the first substrate shown in FIG. 2 aligned with the second substrate shown in FIG. 3.
Figure 5:
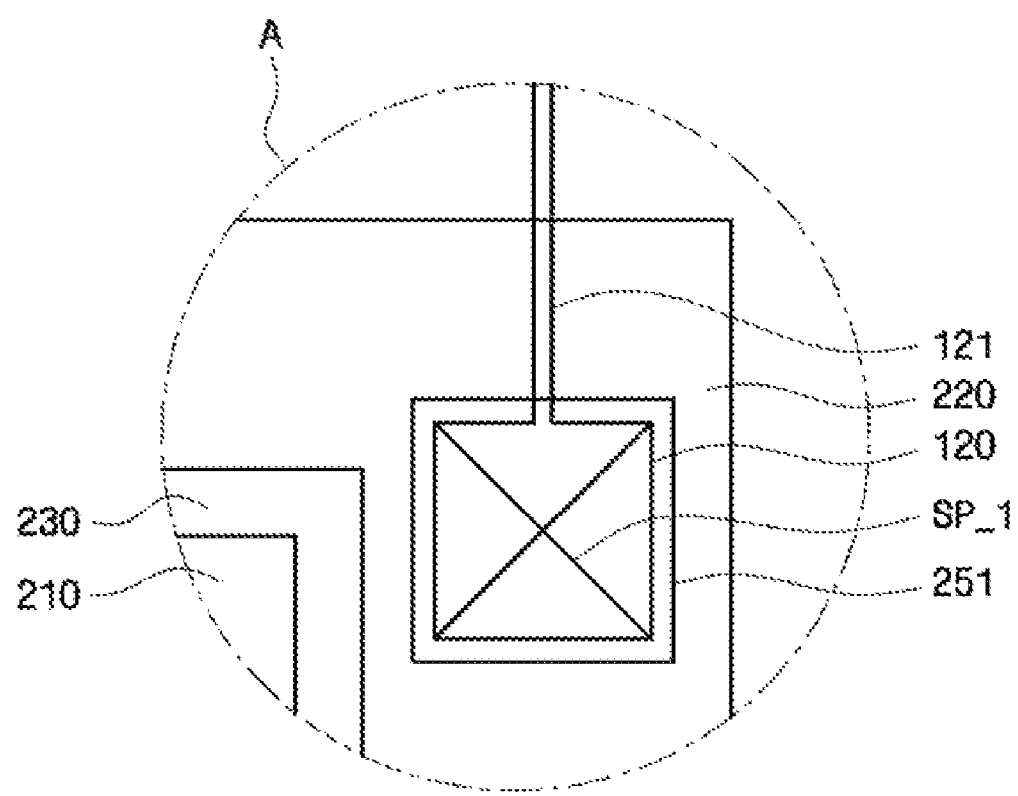
FIG. 5 is a plan view of enlarged portion A of FIG. 4.
Figure 6:
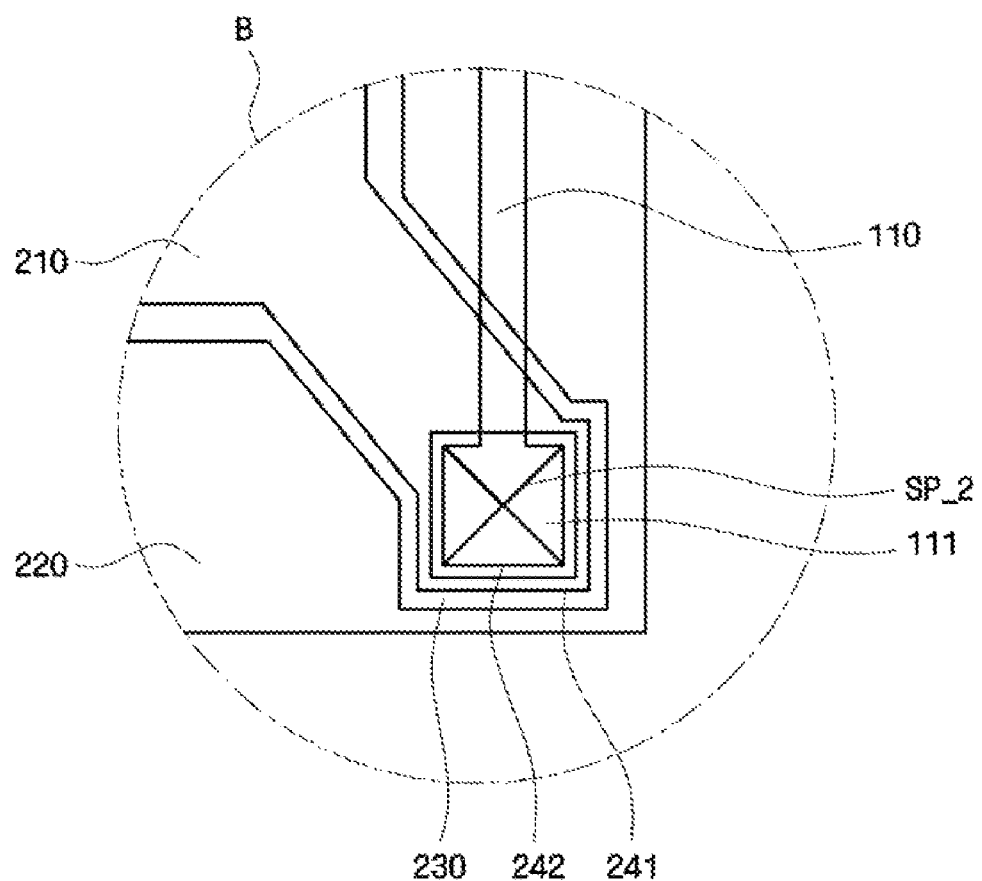
FIG. 6 is a plan view of enlarged portion B of FIG. 4.
Figure 7:
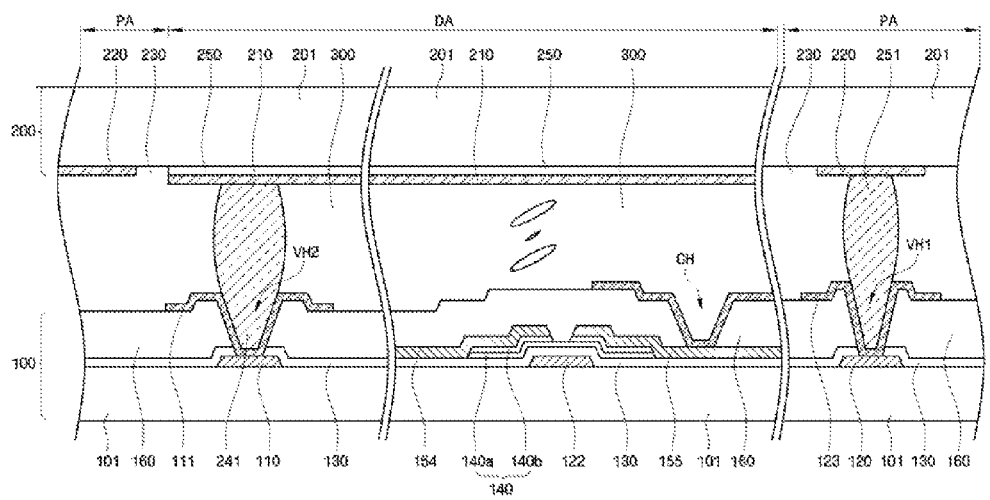
FIG. 7 is a sectional view taken along a line I-I' of FIG. 4.
Figure 8:
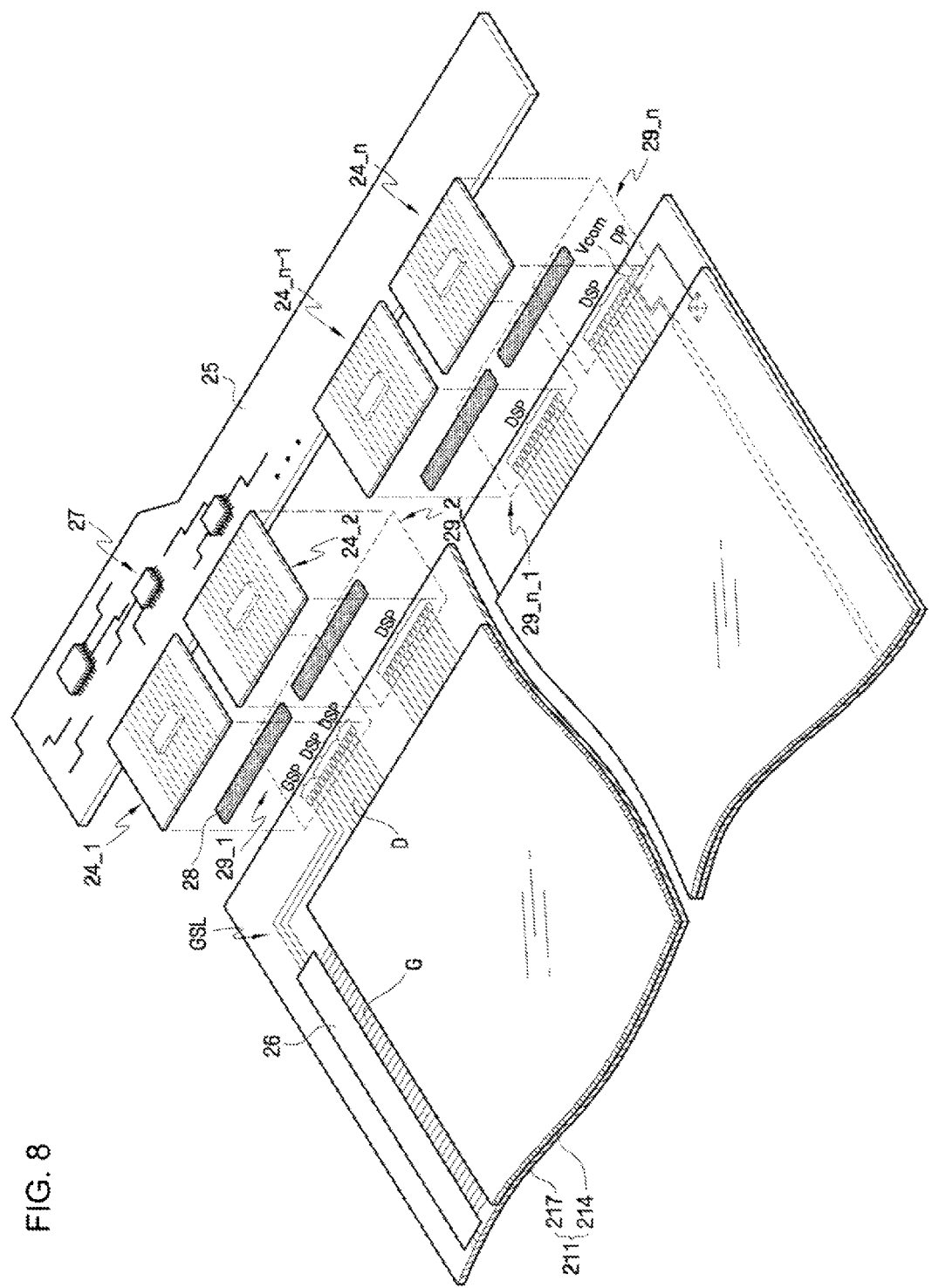
FIG. 8 is a perspective view illustrating the display panel assembly shown in FIG. 1.

FIG. 1 is a perspective view illustrating a display panel assembly including a display panel according to a first embodiment of the present invention, FIG. 2 is a plan view illustrating a first substrate of the display panel shown in FIG. 1, FIG. 3 is a plan view illustrating a second substrate of the display panel shown in FIG. 1, FIG. 4 is a plan view illustrating an overlapping portion of the first substrate shown in FIG. 2 and the second substrate shown in FIG. 3, FIG. 5 is a plan view of enlarged portion A of FIG. 4, FIG. 6 is a plan view of enlarged portion B of FIG. 4, FIG. 7 is a sectional view taken along a line I-I' of FIG. 4, and FIG. 8 is a perspective view illustrating the display panel assembly shown in FIG. 1.

Referring to FIG. 1, the display panel assembly 20 includes a display panel 21, a circuit board 25, and a semiconductor chip package 24. The display panel 21 includes a first substrate 100, a second substrate 200, and a liquid crystal layer (not shown) interposed between the first substrate 100 and the second substrate 200.

The first substrate 100 includes TFTs (thin film transistors) used as switching devices and arranged in a matrix on an insulating support substrate 101. Each of the TFTs has a source terminal, a gate terminal, and a drain terminal which are connected respectively to a respective data line, a respective gate line, and a respective pixel electrode (PE) that is transparent and conductive.

The second substrate 200 faces the first substrate 100 and has RGB (red, green, blue) pixels for color representation which are formed to have a film-like shape on an insulating support substrate 201. In one exemplary embodiment, the second substrate 200 includes a conductive common electrode (not shown) formed on the surface of the second substrate 200, and includes color filters (not shown) that correspond one-to-one to the pixel electrodes PE formed on the first substrate 100. In an alternative embodiment, the color filters may be formed in first substrate 100 rather than second substrate 200. The first substrate 100 may have an array-on-color-filter (AOC) structure in which the gate wiring of the thin film transistor (TFT) array is formed on the RGB color filters (not shown), or a color-filter-on-array (COA) structure in which the RGB color filters are formed on the TFT array.

The liquid crystal layer (not shown) is interposed between the first substrate 100 and the second substrate 200, and the arrangement of liquid crystal molecules in the liquid crystal layer is controlled by an electric field generated between the pixel electrodes PE and the common electrode. The arrangement of the liquid crystal molecules controls the transmittance of light through the liquid crystal layer, thus providing desired images.

The periphery of the display panel 21 is connected to the semiconductor chip package 24 which drives the display panel 21, and is also connected to the circuit board 25.

As shown in FIGS. 1 and 2, the first substrate 100 is divided into a display area (DA) and a peripheral area (PA) surrounding the display area DA. The peripheral area PA includes first, second, third and fourth peripheral areas PA1_1, PA2_1, PA3_1 and PA4_1 located respectively at the upper, lower, left and right sides of the display area DA.

Formed in the display area DA are gate lines GL extending in a first direction, data lines DL extending in a second direction transverse to the first direction, and pixel portions P defined by the gate lines GL and the data lines DL.

The TFTs are connected to the respective gate lines GL, the respective data lines DL, and respective pixel electrodes PE. The TFTs are formed in the respective pixel portions P.

A pad area 29 is provided in the first peripheral area PA1_1 to accommodate contact pads receiving driving signals used to drive the pixel portions P. The pad area 29 is electrically connected to the semiconductor chip package 24.

The pad area 29 includes gate signal input pads (GSP) receiving an externally generated gate signal, data signal input pads (DSP) receiving an externally generated data signal, a common voltage input pad (VcomP) to which a common voltage is applied, and a second pad 122 through which the static electricity generated at the display panel 21 is discharged to the outside of the display panel assembly.

The gate signal input pads GSP are connected to a gate signal output line (not shown) of the semiconductor chip package 24. The gate signal input pads GSP receive the gate signal from a gate signal output pad (not shown) on the circuit board 25 through the gate signal output line. The gate signal is transmitted from the gate signal input pads GSP to a gate driver semiconductor chip package 26 through gate signal transmission lines (GSL in FIG. 8). The gate driver semiconductor chip package 26 is electrically connected to the gate lines GL.

The data signal input pads DSP are connected to data signal output lines (not shown) and are electrically connected to the data lines DL.

The common voltage input pad VcomP is connected to a common voltage output line (not shown) and is electrically connected to a common voltage input line 110 to be described later. The common voltage input line 110 is electrically connected to the common electrode of the second substrate 200 in the display panel 21 to apply a common voltage from the common voltage input pad VcomP to the common electrode.

The second pad 122 is connected to a ground voltage and is electrically connected to a first pad 120 to be described later and to an electrostatic protection member (220 of FIG. 3). Alternatively, the second pad 122 may be connected to a power supply terminal (not shown) of the LCD device or to some other fixed-voltage terminal.

The second pad 122 is connected to the first pad 120 and the electrostatic protection member 220 to discharge static electricity to ground. The second pad 122 may be formed at an end portion of the pad area 29. Alternatively, a number of second pads 122 may be formed and may be placed at both ends of the pad area 29 if desired.

The common voltage input line 110 may be formed in parallel with one side of the display area DA in the fourth peripheral area PA4_1. In some embodiments, the common voltage input line 110 also extends through the second, third and fourth peripheral areas PA_2, PA_3 and PA_4 to surround the display area DA.

The common voltage input line 110 is electrically connected to the common electrode (210 in FIG. 3) of the second substrate 200 to transmit the common voltage from the common voltage input pad VcomP to the common electrode 210. For example, a common voltage input pad 111 may be formed in the fourth peripheral area PA4_1 for electrically connecting the common voltage input line 110 to the common electrode 210. The common voltage input pad 111 is wider than the common voltage input line 110 to provide a large contact area for contacting the common electrode 210 and thus to reduce a voltage drop between the common voltage input pad VcomP and the common electrode 210. A low-resistance contact SP_2 (FIG. 6) may thus be formed between the common voltage input pad 111 and the common electrode 210.

The first pad 120 serves to block the static electricity from the display area DA. The first pad 120 is formed in the peripheral area PA of the first substrate 100 and is electrically connected to the electrostatic protection member (220 of FIG. 2) of the second substrate 200 described below. The first pad 120 is electrically connected to the second pad 122 of the pad area 29 through a connecting line 121. Accordingly, the external static electricity is discharged to the outside through the first pad 120, the connecting line 121 and the second pad 122.

The first pad 120 may be formed in the first, second, third or fourth peripheral area PA1_1, PA2_1, PA3_1 or PA4_1. Alternatively, a plurality of first pads 120 may be formed and may be placed in all of the first, second, third and fourth peripheral areas PA1_1, PA2_1, PA3_1 and PA4_1. Such first pads 120, formed in each of the first to fourth peripheral areas PA1_1, PA2_1, PA3_1 and PA4_1, can be electrically interconnected by extending the connecting line 121 to run along the periphery of the display area DA.

The first pad or pads 120 may be formed of the same metal layer as the gate lines GL or the data lines DL.

Referring to FIG. 3, the second substrate 200 includes the common electrode 210, the electrostatic protection member 220, and an insulator region 230.

The common electrode 210 is formed in the second substrate 200 of the same material as the pixel electrodes PE, e.g., a transparent conductive material. The common electrode 210 faces the display area DA of the first substrate 100. The common electrode 210 is electrically connected to the common voltage input line 110 formed in the first substrate 100 to receive the common voltage. The common electrode 210 may be formed of a transparent conductive material, e.g., indium tin oxide ("ITO") or indium zinc oxide ("IZO").

The electrostatic protection member 220 is electrically disconnected from the common electrode 210 and is formed on the second substrate 200 to surround the common electrode 210. The electrostatic protection member 220 extends through each of the first to fourth peripheral areas PA1_2, PA2_2, PA3_2 and PA4_2 of the second substrate 200. The electrostatic protection member 220 is shaped as a closed loop. The electrostatic protection member 220 may be formed of the same material as the common electrode 210. The electrostatic protection member 220 may be formed of a transparent conductive material, e.g., indium tin oxide ("ITO") or indium zinc oxide ("IZO").

The insulator region 230 electrically insulates the common electrode 210 from the electrostatic protection member 220. In some embodiments, the common electrode 210 and the electrostatic protection member 220 are formed as follows. A layer (not shown) of a transparent conductive material is deposited on the entire surface of the second substrate 200, and the portion of this layer in the insulator region 230 is etched away to form the insulator region. Thus, the insulator region 230 is formed as a gap in the conductive layer. The insulator region 230 can be shaped as a closed loop to completely surround the common electrode 210. Accordingly, the conductive layer is separated into the common electrode 210 and the electrostatic protection member 220. The common electrode 210 and the electrostatic protection member 220 are electrically disconnected from each other. Further, the insulator region 230 is surrounded by the electrostatic protection member 220.

The insulator region 230 blocks the static electricity generated at the edge portion of the second substrate 200 from flowing into the common electrode 210. More particularly, the static electricity generated at the edge portion of the second substrate 200 is blocked from the common electrode 210 by the insulator region 230, and flows along the electrostatic protection member 220 made of a conductive material. Since the electrostatic protection member 220 is electrically connected to the first pad 120 of the first substrate 100, the static electricity flows toward the first pad 120.

Further, since the first pad 120 is connected to the second pad 122 through the connecting line 121, the static electricity flowing into the first pad 120 is discharged to the outside through the connecting line 121 and the second pad 122. Therefore, in the first embodiment, if the static electricity is generated at the edge portion of the second substrate 200, the static electricity can be blocked from flowing into the common electrode 210. Accordingly, the static electricity is preventing from reaching the driver circuitry through the common electrode 210 and damaging the driver circuitry.

The common electrode 210 includes a protrusion 241 extending from a corner of the common electrode 210 toward a corner of the second substrate 200. The protrusion 241 is electrically connected to the common voltage input line 110 of the first substrate 100, thereby allowing the common voltage to be applied to the common electrode 210. In order to provide a low-resistance path to the common electrode 210, the conductive path from the common voltage input line 110 to the common electrode 210 should preferably be short and have a large cross sectional area. This goal is advanced by the protrusion 241 overlapping the common voltage input pad 111.

The display panel 21 having the first substrate 100 and the second substrate 200 attached to each other will now be described with reference to FIGS. 4 through 7.

Referring to FIGS. 4 through 7, the first pad 120 of the first substrate 100 is electrically connected to the electrostatic protection member 220 of the second substrate 200. In this embodiment, the first pad 120 and the electrostatic protection member 220 are electrically connected to each other by a first connecting member 251 provided in the second substrate 200. More particularly, the first pad 120 is formed of the same layer as the gate lines GL, and a first via hole VH1 is formed through a gate insulating film 130 and a passivation layer 160 to expose the first pad 120. The first connecting member 251 and the first pad 120 are electrically connected to each other through the first via hole VH1. A low-resistance contact SP_1 may thus be formed between the first connecting member 251 and the first pad 120.

In order to improve the contact between the first pad 120 and the first connecting member 251 and thus reduce the voltage drop across the contact, a first connecting pad 123 may be formed between the first connecting member 251 and the first pad 120. The first connecting member 251 may be formed of a conductive material, e.g., silver (Ag) or aluminum (Al). Further, the first connecting member 251 is formed by an inkjet printing method or a dispensing method using a paste of the conductive material, e.g., silver (Ag) or aluminum (Al).

Since the first pad 120 and the electrostatic protection member 220 are electrically connected to each other by the first connecting member 251, the static electricity present at the edge portion of the second substrate 200 can be discharged to the outside through the first connecting member 251, the first pad 120, the connecting line 121 and the second pad 122.

Referring to FIGS. 4, 6 and 7, the common voltage input pad 111 of the first substrate 100 and the common electrode protrusion 241 of the second substrate 200 are electrically connected to each other. In this embodiment, the common voltage input pad 111 and the common electrode protrusion 241 are electrically connected to each other by a second connecting member 242 provided in the second substrate 200. The common voltage input pad 111 can be formed of the same layer as the gate lines GL, and a second via hole VH2 can be formed through the gate insulating film 130 and the passivation layer 160 to expose the common voltage input pad 111. The second connecting member 242 and the common voltage input pad 111 are electrically connected to each other through the second via hole VH2. A low-resistance contact SP_2 may be formed between the second connecting member 242 and common voltage input pad 111.

In order to improve the contact between the common voltage input pad 111 and the second connecting member 242 and thus reduce the voltage drop across the contact, a second connecting pad 112 may be formed between the common voltage input pad 111 and the second connecting member 242. The second connecting member 242 may be formed of a conductive material, e.g., silver (Ag) or aluminum (Al). Further, second connecting member 242 is formed by an inkjet printing method or a dispensing method using a paste of the conductive material, e.g., silver (Ag) or aluminum (Al).

The common voltage input pad 111 and the common electrode protrusion 241 are electrically connected to each other by the second connecting member 242, so that the common electrode 210 of the second substrate 200 is electrically connected to the common voltage input pad 111. In addition, since the common voltage input pad 111 and the common voltage input line 110 are electrically connected to each other, the common electrode 210 is electrically connected to the common voltage input line 110.

Referring to FIG. 7, the pixel portions P are formed on the first substrate 100. Each pixel portion P includes a TFT and a pixel electrodes PE. Each pixel portion P includes gate insulating film 130.

In detail, formed in the first substrate 100 are the gate electrodes 124 connected to the gate lines GL, and also formed in the first substrate 100 are the common voltage input line 110 and the first pad 120. The gate electrode 124, the common voltage input line 110 and the first pad 120 may be formed, for example, of aluminum-neodymium. In this embodiment, each gate electrode 124 is formed in the respective pixel portion P of the display area DA, and the common voltage input line 110 and the first pad 120 are formed in the peripheral area PA.

The gate insulating layer 130 is formed on the first substrate 100 after the gate electrodes 124 and the common voltage input line 110. The gate insulating layer 130 may be formed, for example, of silicon nitride ($SiN_x$) or silicon oxide ($SiO_x$).

A channel layer 140 is formed in the first substrate 100 after the gate insulating layer 130. In each pixel portion P, the channel layer 140 includes a stack of an active layer 140a on the bottom and of an ohmic contact layer 140b on top. In an exemplary embodiment, the active layer 140a may be formed of amorphous silicon (a-Si), and the ohmic contact layer 140b may be formed of amorphous silicon heavily doped with n-type impurities (n+a-Si).

Source electrodes 154 and drain electrodes 155 are formed in the first substrate 100 after the channel layer 140. In each pixel portion P, the corresponding source electrode 154 extends from the respective data line DL, and covers a predetermined area of the channel layer 140. The drain electrode 155 is separated from the source electrode 154 by a predetermined distance, and covers a predetermined area of the channel layer 140. The ohmic contact layer 140b is removed between the source electrode 154 and the drain electrode 155 disposed over the gate electrode 124, and the active layer 140a is exposed.

Each of the TFTs formed in the first substrate 100 includes the corresponding gate electrode 124, active layer 140a, ohmic contact layer 140b, source electrode 154 and drain electrode 155. Each of the drain electrodes 155 is electrically connected to the respective pixel electrode PE.

The passivation layer 160 is formed over the gate insulating layer 130, the source electrodes 154 and the drain electrodes 155. The passivation layer 160 may be formed, for example, of silicon nitride ($SiN_x$) or silicon oxide ($SiO_x$). In this embodiment, at an end of each drain electrode 155, the passivation layer 160 is removed to form a contact hole CH exposing the drain electrode 155. The pixel electrodes PE are formed over the passivation layer 160. Each pixel electrode PE contacts the respective drain electrode 155 through the respective contact hole CH. In an exemplary embodiment, the pixel electrodes PE may be made of a transparent conductive material such as indium tin oxide (ITO) or indium zinc oxide (IZO). The first and second connecting pads 123 and 112 may be formed of the same materials as the pixel electrodes PE at the same time as the pixel electrodes PE.

A color filter layer 250 may be formed in a the second substrate 200.

The color filter layer 250 is formed to face the pixel electrodes PE formed in the first substrate 100, and includes red (R), green (G) and blue (B) color filters. Black matrixes (not shown) are formed at the boundaries of the color filters.

The first substrate 100 and the second substrate 200 are attached to each other so as to be spaced from each other by a gap of a predetermined width. A liquid crystal layer 300 is introduced in the gap between the first substrate 100 and the second substrate 200, thereby completing fabrication of the display panel 21.

The display panel assembly 20 including the display panel 21 according to the first embodiment of the present invention will be described with reference to FIG. 8.

As shown in FIG. 8, a semiconductor chip package 24 includes semiconductor chip packages 24_1 to 24_n attached to the display panel 21 using an anisotropic conductive film 28. The pad area 29 may include first to nth pad groups 29_1 to 29_n. In this embodiment, the first to nth pad groups 29_1 to 29_n face the semiconductor chip packages 24_1 to 24_n, respectively.

The first to nth pad groups 29_1 to 29_n are electrically connected to first sides of the semiconductor chip packages 24_1 to 24_n. In this embodiment, second sides of the semiconductor chip packages 24_1 to 24_n are electrically connected to the circuit board 25. The semiconductor chip packages 24_1 to 24_n may include packages of a tape carrier package (TCP) type, a chip-on-film (COF) type, or a chip-on-glass (COG) type. In addition to the semiconductor chip packages 24_1 to 24_n, the display panel 21 and the circuit board 25 may be electrically connected to each other through a flexible circuit board (not shown).

Further, circuits 27 including a timing controller and other circuits are mounted on the circuit board 25 to provide the gate signal to the gate driver semiconductor chip package 26 and to provide the data signal to the semiconductor chip package 24. The circuit board 25 may be a printed circuit board.

Figure 9:
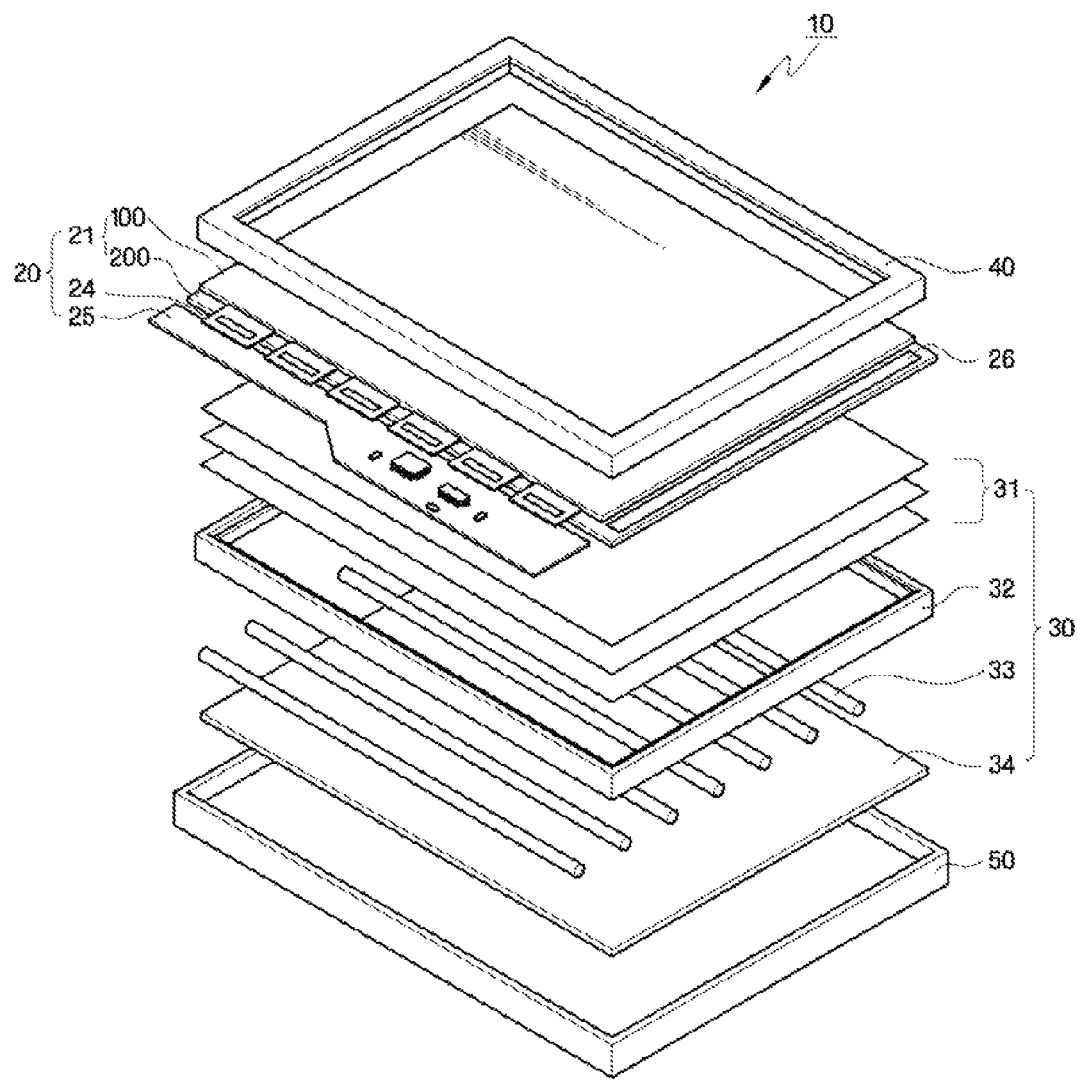
FIG. 9 is a perspective view illustrating a liquid crystal display device according to a second embodiment of the present invention.

FIG. 9 is a perspective view illustrating a liquid crystal display device according to a second embodiment of the present invention. For the sake of convenience of illustration, elements identical to those shown in FIGS. 1 through 8 are indicated by identical reference numerals, and a description thereof will be omitted.

Referring to FIG. 9, the liquid crystal display device 10 generally includes a display panel assembly 20, a backlight assembly 30, a top receiving container 40, and a bottom receiving container 50.

The display panel assembly 20 may include the display panel 21 according to the first embodiment of the present invention.

The backlight assembly 30 includes optical sheets 31, a molded frame 32, a light source 33 and a reflective plate 34. The optical sheets 31 are disposed over the light source 33 to diffuse and focus the light from the light source 33. The optical sheets 31 include a diffusion sheet, a prism sheet, and a protection sheet.

The molded frame 32 supports and fixes the optical sheets 31, the light source 33 and the reflective plate 34.

The light source 33 may be of a direct type in which a plurality of lamps are arranged in parallel. The light source 33 may also be of an edge type. The edge-type light source may include a light guide plate (not shown). As shown in the exemplary embodiment, a linear light source, such as a cold cathode fluorescent lamp (CCFL), or a hot cathode fluorescent lamp (HCFL), may be used as the light source 33. In alternative exemplary embodiments, the light source 33 may be a point light source, such as a light emitting diode (LED).

The reflective plate 34 may be disposed below the light source 33, and reflects the light supplied from the light source 33 to be directed toward display panel assembly 20. The reflective plate 34 may be integrally formed with a bottom surface of the bottom receiving container 50.

The embodiments described above illustrate but do not limit the present invention. Other embodiments are within the scope of the invention, as defined by the appended claims.

What is claimed is:

1. A display panel comprising:
a first substrate comprising: a display area (DA) having a plurality of pixel portions, and a peripheral area (PA) surrounding the display area;
a second substrate comprising a common electrode and an electrostatic protection member electrically disconnected from the common electrode and surrounding the common electrode and electrically connected to a fixed-voltage terminal through the first substrate; and
a liquid crystal layer between the first substrate and the second substrate.

2. The display panel of claim 1, wherein the common electrode and the electrostatic protection member are insulated from each other by a gap between the common electrode and the electrostatic protection member.

3. The display panel of claim 2, wherein the gap is shaped as a closed loop surrounding the common electrode.

4. The display panel of claim 3, wherein the electrostatic protection member is shaped as a closed loop surrounding the gap.

5. The display panel of claim 1, further comprising a first pad formed in the peripheral area of the first substrate and electrically connected to the electrostatic protection member.

6. The display panel of claim 5, wherein the peripheral area includes a pad area, wherein the pad area includes one or more signal input pads for applying one or more signals from an external circuit board to the display area, and the pad area also comprises a second pad electrically connected to the first pad.

7. The display panel of claim 6, wherein the electrostatic protection member and the first pad are electrically connected to each other by a first connecting member.

8. The display panel of claim 6, wherein the pad area is electrically connected to a first side of a semiconductor chip package, and the external circuit board is electrically connected to a second side of the semiconductor chip package.

9. The display panel of claim 6, wherein the pad area is electrically connected to a first end of a flexible circuit board, and the external circuit board is electrically connected to a second end of the flexible circuit board.

10. The display panel of claim 1, wherein the common electrode includes a protrusion extending toward a corner of the second substrate from a corner of the common electrode.

11. The display panel of claim 10, further comprising a common voltage input line formed in the first substrate.

12. The display panel of claim 11, wherein the protrusion is electrically connected to the common voltage input line.

13. The display panel of claim 12, wherein the common voltage input line and the protrusion are electrically connected to each other by a second connecting member.

14. A manufacturing method for fabricating the display panel of claim 1, the method comprising fabricating the first and second substrates and providing the liquid crystal layer between the first and second substrates.

15. A liquid crystal display device comprising:
a light source; and
a display panel for receiving light from the light source and display an image, the display panel comprising:
a first substrate a display area (DA) having a plurality of pixel portions, and a peripheral area (PA) surrounding the display area;
a second substrate comprising a common electrode and an electrostatic protection member electrically disconnected from the common electrode and surrounding the common electrode and electrically connected to a fixed-voltage terminal through the first substrate; and
a liquid crystal layer between the first substrate and the second substrate.

16. The liquid crystal display device of claim 15, wherein the common electrode and the electrostatic protection member are insulated from each other by a gap between the common electrode and the electrostatic protection member.

17. The liquid crystal display device of claim 16, wherein the gap is shaped as a closed loop surrounding the common electrode.

18. The liquid crystal display device of claim 17, wherein the electrostatic protection member is shaped as a closed loop surrounding the gap.

19. The liquid crystal display device of claim 15, further comprising a first pad formed in the peripheral area of the first substrate and electrically connected to the electrostatic protection member.

20. The liquid crystal display device of claim 19, wherein the peripheral area includes a pad area, wherein the pad area includes one or more signal input pads for applying one or more signals from an external circuit board to the display area, and the pad area also comprises a second pad electrically connected to the first pad.

21. The liquid crystal display device of claim 15, wherein the common electrode includes a protrusion extending toward a corner of the second substrate from a corner of the common electrode.

22. A method for displaying images by a liquid crystal display device of claim 15, the method comprising connecting the fixed-voltage terminal to a fixed voltage.

* * * * *